Aug. 7, 1951 M. M. CANNON, JR 2,563,099
STIRRING AND IMPELLING IMPLEMENT FOR MOLTEN GLASS
Filed Dec. 22, 1948
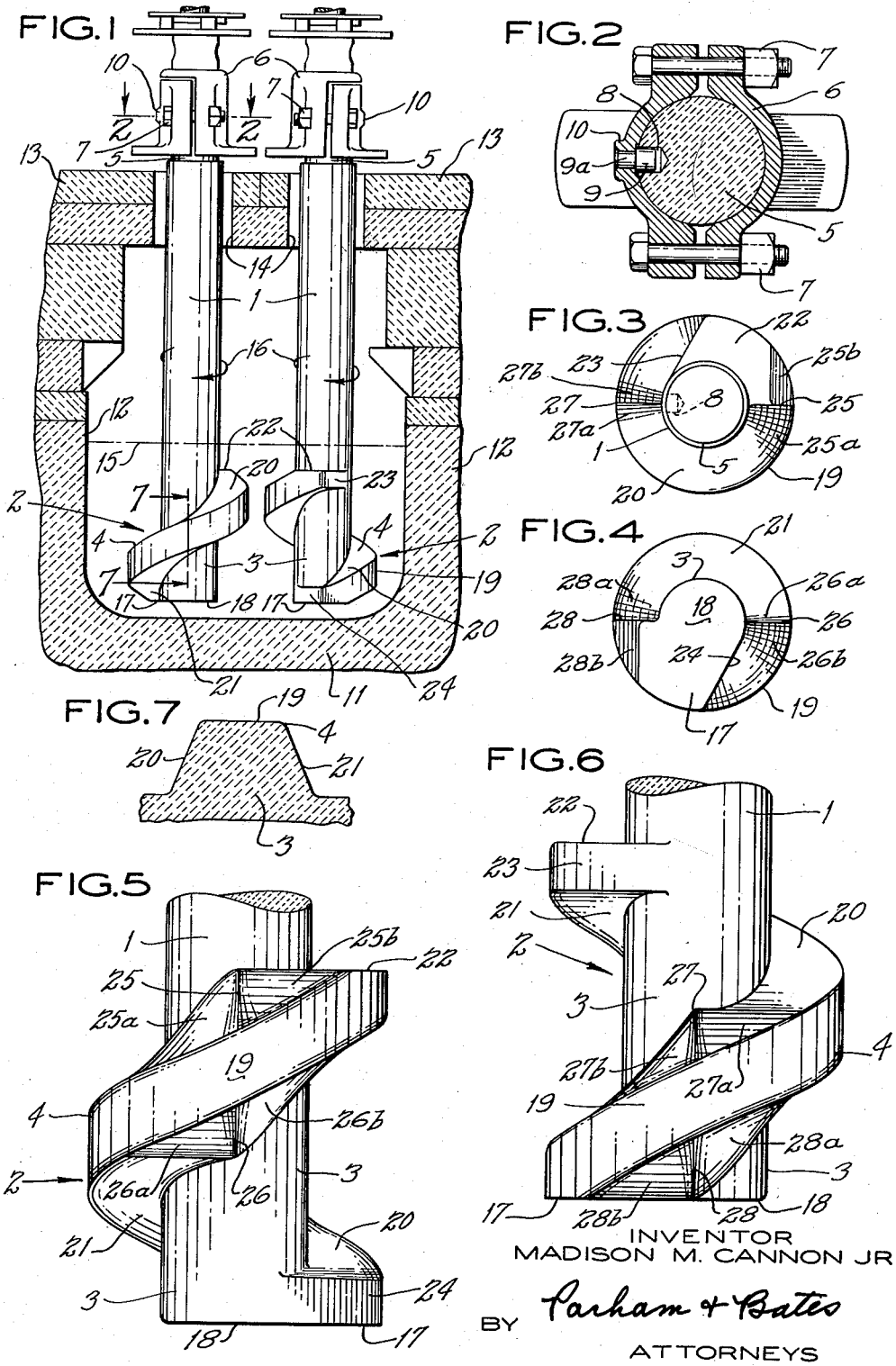
INVENTOR
MADISON M. CANNON JR.
BY Parham & Bates
ATTORNEYS Patented Aug. 7, 1951

2,563,099

UNITED STATES PATENT OFFICE 2,563,099

STIRRING AND IMPELLING IMPLEMENT FOR MOLTEN GLASS

Madison M. Cannon, Jr., West Hartford, Conn., assignor to Emhart Manufacturing Company, a corporation of Delaware Application December 22, 1948, Serial No. 66,782

4 Claims. (Cl. 259—104)

This invention relates generally to improvements in stirrers for molten glass and more particularly to a stirring and impelling implement adapted to be supported so as to depend into a stream or body of molten glass in a flow channel of a feeder forehearth or like glass container and to be rotated about its vertical axis.

In the feeding of molten glass in charges obtained from glass issuing from an outlet in the bottom of a feed spout or bowl at the outer end of a glass feeder forehearth flow channel, it is important that the glass passing to the outlet be as nearly homogeneous and uniform in temperature and condition as possible. Since inequalities of temperature and condition oftentimes exist in different portions of a glass stream moving to such an outlet and striae and cords may be present therein, feeding of glass satisfactorily is in practice usually attended by the problem of dispersing and eliminating cords, striae and inequalities and commingling thermally different portions of glass to bring about a more uniform condition at the outlet. Various types of stirring implements heretofore have been proposed and some have been used in actual practice. All of such implements of which I have any knowledge have had important shortcomings resulting from their particular forms and characteristic modes of functioning. Thus, some of such stirrers were incapable of effecting desirable commingling of glass from vertically different strata or portions of the stream and some produced undesirable wave effects at the surface of a stream. Stirring implements of the prior art which were designed to circulate glass in vertical planes were not able to do more than that. Generally, such stirrers were incapable of use in conjunction with adjacent like stirrers or other glass contact surfaces effectively to attenuate, divide and disperse cords, streaks of contaminated glass and striae existing in a stream or supply body and to eliminate inequalities of temperature and condition which may occur at different levels therein.

An object of the present invention is to provide a stirring and impelling implement for molten glass which is adapted to be rotated about its axis in a vertical position with a glass engaging portion thereof disposed in a molten glass stream or body and formed to have an improved action on the glass so far as concerns dispersal and elimination of cords and other striae and elimination of other inequalities therein.

A further object of the invention is to provide a refractory stirring and impelling implement having an elongate shank by which the implement can be operatively suspended from above so as to depend into the molten glass of a stream or body in a flow channel of a forehearth to position the lower end of the implement close to the bottom of the glass containing channel structure and having the portion thereof which depends in the glass provided with a spiral thread or ridge of such shape, pitch and dimensions as to act on the glass in contact therewith and adjacent thereto in a novel way and with an improved result when the implement is rotated about its vertical axis.

A further object of the invention is to provide a stirring and impelling implement of the character described which is formed at its lower end so as to be effective to plow up relatively cool and viscous glass tending to remain at the bottom of a stream or body in which the implement depends and to effect desirable dispersal and circulation of the plowed up increments of glass into the hotter, less viscous glass of higher level portions of the stream.

A still further object of the invention is to provide a stirring and impelling implement of the character described which is adapted for coaction with one or more other similar implements and/or with an adjacent glass confining wall of a channel or other glass containing structure into which the implement depends so as to produce circulatory movements of glass along paths in the glass having both vertical and horizontal components and to effect desirable attenuation, division and dispersal of cords, streaks of contaminated glass and other striae.

A still further object of the invention is to provide a stirring and impelling implement having an elongate shank and a stirrer head provided with a spiral glass impelling thread or ridge thereon, all designed to permit manufacture of the implement in one piece of suitable refractory material by slip casting in a mold of a generally conventional two-part type.

Other objects and advantages of the invention hereinafter will be pointed out or will become obvious from the following description of an example implement of the invention and of a use thereof, all as illustrated in the accompanying drawings, in which:

Fig. 1 is a vertical section through a molten glass flow channel structure in which two of the novel stirrers are operatively disposed for cooperative action with each other and with the side walls and bottom of the forehearth channel;

Fig. 2 is a section on a somewhat enlarged scale along the line 2—2 of Fig. 1, showing the upper end of one of the implements in its supporting chuck or holder;

Fig. 3 is a top plan view of the novel stirring and impelling implement of the invention;

Fig. 4 is a bottom plan view of the implement;

Fig. 5 is an elevation of the stirring head portion of the implement;

Fig. 6 is a view similar to Fig. 5, but showing the reverse side of the implement; and Fig. 7 is a fragmentary section on an enlarged scale of the thread or ridge portion of the stirring head at approximately the place indicated by the line 7—7 of Fig. 1, the view being taken when the implement is lying on its side.

The novel implement of the invention comprises an elongate shank 1 having a stirring head, generally designated 2, at one end. The stirring head comprises a core 3, which may be an end extension of the shank, and a spiral thread or ridge on the core. The shank 1 may be cylindrical and of a predetermined diameter, as hereinafter explained. The core 3 or end entension of the shank on which the thread or ridge 4 is provided may be similar in configuration and size.

The end of the shank opposite the stirrer head may be reduced in diameter for a short distance from its extremity, as indicated at 5, to fit in a two-part implement holding chuck 6, the cooperative parts of which may be fastened together in gripping relation to the implement by fastening devices 7 in a conventional manner.

The portion 5 of the implement shank to be thus gripped and its chuck 6 may be provided with cooperative means by which a desirable angular position of the implement in the chuck may be established and maintained. As shown, the implement shank end portion 5 has a dowel hole 8 formed therein which may be in line with the adjacent end of the thread 4 of the stirring head on the opposite end of the shank and one of the cooperative clamping parts of the chuck 6 has an inwardly projecting detent, shown in Fig. 2 as a pin 9, to fit in the dowel hole 8 when the chuck is applied to the implement. The location of the pin 9 in the chuck and hence the exact position of the dowel hole in the implement shank as gripped by the chuck is indicated at the outer side of the chuck by a raised portion or boss 10 which is apertured to accommodate the outer portion 9a of the locating pin. Any other suitable arrangement of the cooperative locating elements on the chuck and the implement respectively may be employed, the specific locating means shown and described being merely one example of many known locating means.

The shank of the implement is of sufficient length to dispose the stirrer head in the glass of a stream in a flow channel of a feeder forehearth or like place when the bottom of the stirrer head is close to the bottom of the flow channel and the upper end of the shank projects above the cover or roof of the forehearth channel and is there gripped and held by a chuck. As shown in Fig. 1, a flow channel comprises a bottom 11, vertical side walls 12 and a roof or cover structure 13. The shanks of two of the implements are shown projecting through transversely spaced openings 14 in the forehearth flow channel roof and the upper or attaching end portions of the shanks are held by chucks 6, the shanks being long enough so that the chucks are spaced above the insulating blocks which form the upper layer of the roof of the forehearth to allow cooling air to circulate around and beneath the chucks. It will be noted that in the application of two of the stirring implements to a forehearth channel, as shown in Fig. 1, the stirrer heads are completely submerged in the glass in such channel, the level of a stream or body of such glass being indicated by the line 15. The chucks 6 are angularly disposed in relation to each other so that the two implements carried thereby have their threaded stirrer heads angularly related to each other for advantageous use in cooperation with each other and with the side walls 12 of the channel when the two implements are rotated in the same direction, specifically clockwise, about their individual axes as indicated by the rotational direction arrows 16. Specifically, the threads of the two stirrers are located 180° out of phase in the installation partially shown in Fig. 1. In such an installation, the plurality of stirrers may be arranged, supported and driven substantially as disclosed and claimed in the copending application of the present applicant and Karl E. Peiler, Serial No. 522,456, filed February 15, 1944, for Apparatus For Homogenizing Molten Glass in a Forehearth, on which Patent No. 2,467,809 was granted April 19, 1949, and of which the present application is a continuation in part.

The diameter of the shank of the implement of the invention desirably is smaller than that of the glass engaging head portion thereof, being predetermined to provide a shank of sufficient strength but without excessive size which would add undesirably to the weight to be supported when installed and to be handled in changing implements. Also, a relatively small diameter of shank is desirable to minimize disturbances of the glass surface where the implement enters the glass. Also, an unnecessarily large diameter shank would increase the cost of manufacture and the time required therefor.

The glass engaging spiral thread of the stirrer head of the implement preferably is entirely located below the surface of the glass to avoid turbulence and bubbles in the surface, although it is possible to obtain good results with such thread extending above such surface. The thread extends spirally on the core angularly around the axis of the implement sufficiently far to give effective action when the implement is rotating about its axis. As shown, the thread extends approximately 360° about this axis and this is preferred, particularly as adapting the implement for continuous and uniform coaction with a like cooperative implement or with an adjacent coacting wall of a glass flow channel. More than 360° of spiral thread on the implement may be employed with good results under some conditions as in a case in which the depth of glass is sufficient to permit this without making the thread with a pitch too small. As shown, the thread or ridge 4 has a relatively coarse or large pitch so that it extends lengthwise of the core or shank extension of the implement a substantial distance in making approximately a full turn about the axis of such implement. The pitch of the thread may be varied within fairly wide limits but should not be so small that the groove between adjacent turns or portions of the thread is so narrow as to put too much drag on glass which is being moved vertically by rotation of the implement. Too narrow a groove limits such vertical motion and may prevent it altogether. The pitch of the thread is related to the outside diameter of the glass engaging portion of the implement. The slope of the thread depends on both the pitch and the diameter and is less or greater with a larger or smaller diameter and the same pitch.

The thread is made with its outer face or crest surface of substantial width and preferably cylindrical and concentric with the implement shank. This adapts such surface for uniform and effective coaction with the corresponding part of a cooperatively disposed like implement or with an adjacent wall of a flow channel in which the implement is disposed in cooperative association with each other in the same forehearth channel. The substantial width of the outer face of the thread provides for wear and insures a good dragging action on the glass in service. The thread tapers from its base or root surface to its crest or outer surface for strength and to provide for wear. This also is a feature of advantage in adapting the implement for manufacture by slip casting in a mold as hereinafter will be explained.

The thread is formed on the implement so that its lower end has a flat bottom surface, indicated at 17, flush with a flat end surface 18 of the implement core, the flat surface 17, 18 being substantially perpendicular or normal to the axis of the implement. The implement thus may safely be positioned with its lower end very close to the forehearth channel bottom. When the implement is rotated about its axis in a clockwise direction as indicated in Fig. 1, the generally square, flat-bottomed lower end portion of the thread will plow the colder and more viscous glass from the bottom of the flow channel and direct it upwardly into and commingle it with hotter and less viscous glass at higher levels in the flow channel.

A full size implement of the invention which is suitable for use in a feeder forehearth flow channel in common use may have the following dimensions and features, these being given by way of example and not of limitation as obviously considerable variations therein may be made and substantial benefits of the invention still obtained.

The shank of such a full size implement may be approximately 3" in diameter, the implement may have an overall length of approximately 27", and the length of the relatively reduced chuck engaging upper end portion of the shank may be approximately 4". The extent of the thread 4 lengthwise of the implement is approximately 7½", the diameter of the core on which the thread is provided is approximately 3", the same as the shank, and the outer diameter of the threaded portion is approximately 6". The depth of the thread, i. e., the radial distance from the core to the crest or outer surface of the thread is approximately 1½" and the width of such crest or outer surface, except at the ends of the thread where it is narrower, is approximately 1⅝". The crest or outer surface of the thread is designated 19.

The thread has an upper side surface, designated 20, and a lower side surface, designated 21. The upper side surface of the upper end portion of the thread is flattened at its upper extremity as indicated at 22, Figs. 1, 3, 5 and 6, so as to lie in a plane approximately normal or perpendicular to the axis of the implement. As previously explained, the lower side surface of the lower end portion of the thread is flattened at 17 to lie flush with the flat lower end surface of the implement core. This is shown in Figs. 1, 4, 5 and 6. The end surface of the upper end of the thread, indicated at 23, is approximately rectangular in outline and lies in a vertical plane approximately tangent to the periphery of the core. See Figs. 1, 3 and 6. The lower end surface of the thread, indicated at 24, Figs. 1, 4 and 5, similarly is approximately rectangular and approximately tangent to the surface of the core. As indicated by the right-hand implement in Fig. 1, the end portions of the thread slightly overlap except at the crest or outer surface of the thread where its end surfaces 23 and 24 are approximately aligned vertically, these end surfaces therefore lying in tangential vertical planes which intersect at the line of the opposite ends of the crest or outer surface 19 of the thread.

Intermediate its ends, as approximately indicated by the section shown in Fig. 7, the side surfaces of the thread slope regularly and symmetrically at an angle of approximately 22° from the normal to the axis of the implement, the thread thus tapering from a width at the core of approximately 3⅛" to the width of the crest or outer surface which, as aforesaid, is approximately 1⅝" at this place. It hereinbefore has been indicated that it is advantageous to make the implement by slip casting in a mold and preferably in a two-part mold as such implement then is stronger, better wearing and less costly than when made by other known methods. To permit drawing the implement from such a two-part mold it is necessary to vary the slope of the side surfaces of the thread between its middle portion and the relatively flat extremities thereof to obviate an undercut in either half of the mold in which the thread is formed. The thread therefore is formed to be relatively thick between its middle portion and its relatively flat extreme upper end portion so as to provide a ridge, indicated at 25, Fig. 5, of relatively greater slope or angle to the normal on the upper side surface of the thread and a similar ridge, indicated at 26, on the lower side surface of the thread and directly beneath the ridge 25. From the ridge 25, the upper side surface of the thread slopes locally at 25a toward the middle portion of such thread and at 25b is formed to merge into the flattened surface 22 of the upper end portion of the thread. The lower side surface of the thread slopes at opposite sides of the ridge 26 at 26a and 26b toward the middle portion and the upper end, respectively, of the thread. At the opposite side of the core 3, the lower portion of the thread is similarly thickened to provide a ridge 27 on its upper side surface and a ridge 28 on its lower side surface directly therebeneath as shown in Fig. 6. The upper side surface of this portion of the thread slopes at 27a toward the middle portion of the thread and at 27b toward the lower extremity thereof. The lower side surface of this portion of the thread slopes at 28a toward the middle portion of the thread and at 28b is formed to merge into the flattened surface 17 at the lower end of the thread. The ridges 25, 26, 27 and 28 all lie in a plane which longitudinally bisects the complete implement. See Figs. 3 and 4, also. In the manufacture of this implement in a two-part mold, the parts of such mold meet at this plane and hence may be separated at this plane without interference from the molded article. One half of such a mold may be removed and the implement left lying in the other half for a longer period as may be desirable in making such an article by slip casting. Also, the particularly described form of tapered thread may be advantageous in view of normal shrinkage while the slip is setting in the mold.

It will be understood that the thread may be provided without the locally thickened or bulging side surface portions in the event that the implement is to be made by a known method which does not require their presence and that these, if provided, may vary in size, shape and other details from those shown in the drawings and herein particularly described. The implement may be otherwise altered and its dimensions and the relative proportions of the component parts thereof changed in ways which will now be obvious to those skilled in the art. The intended or normal position of the implement in use will be vertical or approximately so and the terms "upper," "lower," "top," "bottom," etc., in this specification are to be read as referring to such implement or parts thereof when the implement is in that position.

I claim:

1. A refractory stirring and impelling implement for homogenizing molten glass comprising an elongate shank forming the upper part of the implement and adapted to be gripped, gripping means for holding said implement by its shank, locating means for fixing the angular position of said shank about its axis in said gripping means and for indicating said position to an observer of the gripping means when the latter is in gripping engagement with the shank, a projecting screw thread at the lower part of said implement integral with said shank and extending spirally from the lower end of the implement a substantial distance toward the upper end of the implement, the upper and lower ends of said thread each bearing a predetermined angular relation about said axis to said locating means, said angular relation being determinable by an observer of the gripping means holding the implement without the necessity of actually observing the lower part of the implement, said projecting screw thread having a tapered cross-section in a plane through said axis wider toward the axis and narrower at its outer face, which outer face is of substantial width and is part of the surface of a cylinder whose axis is the axis of the implement, whereby the implement may be projected vertically into a forehearth with its lower part immersed in molten glass and may be rotated in predetermined space and time relation to a similar implement.

2. An elongate refractory stirring and impelling implement for homogenizing molten glass comprising an upper cylindrical shank of relatively smaller diameter and greater length adapted to be held near its upper end by gripping means and a relatively shorter screw threaded glass engaging portion of relatively larger diameter at its opposite, lower part, the extreme lower end of said glass engaging portion having a flat surface substantially normal to the axis of said shank, said screw threaded glass engaging portion being formed by an extension of said shank having a projecting ridge extending spirally a substantial distance angularly around the axis of said shank, said spiral ridge terminating at each end of the spiral in a blunt end of substantial width and having an outer face of substantial width and a tapered cross-section narrower at said outer face and wider toward the axis, said outer face being part of the surface of a cylinder whose axis is the axis of said shank, whereby the implement may be projected vertically through a small opening in a forehearth and close to the forehearth channel bottom with the glass engaging portion immersed in molten glass and the implement may be rotated to co-act with a forehearth wall or another like implement with a minimum of harmful disturbance of the glass surface.

3. An elongate refractory stirring and impelling implement for homogenizing molten glass comprising an upper cylindrical shank of relatively smaller diameter and greater length adapted to be held near its upper end by gripping means and a relatively shorter screw threaded glass engaging portion of relatively larger diameter at the opposite lower part with its extreme lower end a flat surface substantially normal to the axis of said shank, said screw threaded glass engaging portion being formed by an extension of said shank having a projecting ridge extending spirally a substantial distance angularly around the axis of said shank, said spiral ridge terminating at each end of the spiral in a blunt end of substantial width and having an outer face of substantial width and a tapered cross-section narrower at said outer face and wider toward the axis, the taper of the cross-section being greater toward the ends of the extent of the spiral ridge than at its intermediate part to permit the implement to be withdrawn from its mold during manufacture.

4. A refractory stirring and impelling implement for use in molten glass comprising an elongate shank adapted at one end to be held in a chuck and provided with a spiral thread extending thereon from the opposite end of the shank for part only of the length of said shank, the end portion of the spiral thread at said opposite end of the shank being formed as a substantially flat-bottomed lateral projection of substantial outward extent from the periphery of the shank, said flat-bottomed lateral projection being substantially flush with the adjacent end surface of the implement shank and being adapted to plow chips or bits of colder and more viscous glass from beneath said implement upwardly along its thread into hotter glass at a higher level when said implement has been suspended by its shank in position to depend vertically into a stream of molten glass in a glass feeder forehearth channel nearly to the bottom of that channel and is rotated in one direction about its vertical axis, said shank being provided with a dowel hole in the periphery of the portion adapted to be held in said chuck in a predetermined angular relation about the axis of the implement to the adjacent end of the spiral thread on the opposite end of the shank, and a chuck adapted to grip the first-named end of the shank and having an externally embossed portion and a dowel pin projecting inwardly from the externally embossed portion and fitting in said dowel hole when the implement shank is held in the chuck to fix the angular position of the upper end of the spiral thread in relation to the externally embossed portion of the chuck.

MADISON M. CANNON, Jr.

REFERENCES CITED

The following references are of record in the file of this patent:

UNITED STATES PATENTS

| Number | Name | Date |
|---|---|---|
| 970,061 | Kinser | Sept. 13, 1910 |

FOREIGN PATENTS

| Number | Country | Date |
|---|---|---|
| 372,795 | Germany | Apr. 3, 1923 |

OTHER REFERENCES

Pattern Making, page 125, published 1885 by Crosby, Lockwood and Co., London.